United States Patent [19]

Kladnig et al.

[11] Patent Number: 5,036,037

[45] Date of Patent: Jul. 30, 1991

[54] PROCESS OF MAKING CATALYSTS AND CATALYSTS MADE BY THE PROCESS

[75] Inventors: Wolfgang Kladnig; Heinz Krivanec, both of Vienna, Austria

[73] Assignee: Maschinenfabrik Andritz Actiengesellschaft, Graz-Andritz, Austria

[21] Appl. No.: 518,947

[22] Filed: May 4, 1990

[30] Foreign Application Priority Data

May 9, 1989 [AT] Austria .................................. 1101/89

[51] Int. Cl.$^5$ ........................ B01J 21/06; B01J 23/22; B01J 23/24; B01J 23/74
[52] U.S. Cl. .................................. 502/319; 502/305; 502/321; 502/325; 502/335; 502/337; 502/338; 502/350; 502/353; 502/354
[58] Field of Search ............... 502/305, 319, 321, 325, 502/335, 337, 350, 353, 338, 354

[56] References Cited

U.S. PATENT DOCUMENTS

| | | | |
|---|---|---|---|
| 3,677,975 | 7/1972 | Bennett et al. | 502/325 X |
| 4,146,504 | 3/1979 | Deffeyes | 502/337 X |
| 4,661,468 | 4/1987 | Lee et al. | 502/337 X |

FOREIGN PATENT DOCUMENTS

| | | |
|---|---|---|
| 0261590 | 3/1988 | European Pat. Off. . |
| 870242 | 3/1953 | Fed. Rep. of Germany . |
| 1963198 | 6/1971 | Fed. Rep. of Germany . |
| 2503142 | 7/1976 | Fed. Rep. of Germany . |
| 3217751 | 11/1983 | Fed. Rep. of Germany . |
| 1311757 | 3/1973 | United Kingdom . |

Primary Examiner—W. J. Shine
Attorney, Agent, or Firm—Fleit, Jacobson, Cohn, Price, Holman & Stern

[57] ABSTRACT

Process for producing catalysts for use within hydrogenation, oxidation, dehydration or dehydrogenation processes comprising oxides, in pure or mixed form, or being applied as mixed crystal systems, made of nickel, cobalt and molybdenum, vanadium, tungsten, titanium and chromium, starting with their corresponding aqueous solutions of their respective chlorides, fluorides or nitrates, which afterwards are processed within a pyrohydrolysis plant to gain the oxide powders, of typical specific surfaces areas of 1 to 100 m$^2$/g, agglomerate sizes of 1 to 500 microns and mean particle sizes of 20 to 30 microns. The corresponding anions of these salt solutions are transformed during pyrohydrolysis into their respective acids, which can be regained by absorptive means and which thereafter can be returned to a chemical dissolving process to make the salts and solutions for the pyrohydrolysis, which means an economic advantage. A further process comprises the prereduction of these spray roasted oxide powders at high temperatures, up to a maximum of 800° C. The catalytically active constituents also can be made by this process by an in-situ precipitation on an inactive carrier, such as alumina, titaniumdioxide, phosphorpentoxide or also silicates. A further ceramic processing of such spray roasted powders into ceramic parts (pellets, balls, etc.) is possible.

7 Claims, 7 Drawing Sheets

PROCESS OF MAKING CATALYSTS AND CATALYSTS MADE BY THE PROCESS

BACKGROUND OF THE INVENTION AND PRIOR ART

The present invention relates to a process for producing catalysts for their use within heterogeneously catalyzed reactions.

Those catalysts which are referred to hereafter are applied within a great number of chemical and petrochemical processes, such as oxidation, hydrogenation or dehydrogenation, but also air or off-gas purification, to mention but a few.

Nickel catalysts for example are used in many processes for catalytic hydrogenation, i.e. hydrogen transfer reactions such as:
syn-gas processing of naphtha or gaseous hydrocarbons,
oxo-gas reforming (steam reforming),
methanation,
hydrotreating, hydrorefining,
hydrodesulfurization (HDS),
selective hydrogenation.

Usually nickel catalysts are used in their metallic form, fixed on a suitable carrier material, such as $\alpha$(alfa), $\gamma$(gamma), $\theta$(theta)-alumina, $SiO_2.Al_2O_3$ and also other ceramic carriers (tablets, pellets, Raschig-rings) or also on zeolites. Usually hydrogenation catalyst contain 10 to 50 wt % NiO, which normally is deposited through impregnation techniques, which are soaking processes.

Water soluble inorganic or organic salts are normally used for impregnation of a carrier, e.g. nickel nitrate, —chloride, formiate or oxalate. In addition to these impregnation techniques also coprecipitation of mixed salt solutions is used, such as nickel together with aluminum salts, like $AlCl_3$ or $Al(OH)Cl_2$, described in patents U.S. Pat. Nos. 3,846,284 (J. Jaffe) and 3,846,285 (H. Beuther et al.)

OBJECTS AND BRIEF GENERAL DESCRIPTION OF THE INVENTION

It is thus an object of the present invention to develop a process which starts from an ideally mixed solution of the catalytically active components and ends to have a product (catalyst) made which still has the catalytically active constituents ideally mixed and dispersed at the catalysts surface and which also is defined within a certain crystallographic form and possesses certain bulk powder properties.

To have the above requirements fulfilled the present invention relates to the formation of the pure or mixed oxides, or of the mixed crystals, made by a spray roasting process within a known pyrohydrolysis plant, starting of the respective chlorides, fluorides or nitrates of elements such as nickel, cobalt, molybdenum, vanadium, chromium, aluminum and iron, titanium and tungsten, dissolved in water.

The pyrohydrolysis then allows the dissociative formation of the respective oxides and their corresponding acids, such as hydrochloric, hydrofluoric or nitric acid which are recycled by this process to be used again. The oxide powders formed by this process usually have a specific surface area of 1 to 100 m²/g (BET), a mean particle size between 20 to 30 microns, and contain large agglomerate structures of 1 to 500 microns.

The very small primary crystal sizes and the relatively high specific surface area of these powders, which have the catalytically active ions very homogeneously distributed, finally lead to excellent catalytic properties. The corresponding acids of the water soluble salts, such as HCl, $HNO_3$, HF or their mixtures, are recovered by use of absorption towers (isothermal or adiabatical operation) as well as using gas scrubbers and further means with total recovery of all the corresponding acids. Such a 100% recovery is possible, with the acids finally returned to the chemical process of metal dissolving, e.g. the stack gases of the hydropyrolysis plant are purified by modern absorptive means to match stringent pollution controls.

The process according to the invention yields a homogenously mixed final material thereby saving most of the usually necessary mixing and blending processes, comprising normally intensive milling to produce mixed oxide powders. This of course means considerable saving of costs and time.

A further characteristic of the invention comprises spray roasting a suspension of the catalytically active salt, dissolved in water together with a suspension of the insoluble inert carrier, e.g. bentonite, aerosil, $SiO_2.Al_2O_3$, or $Al_2O_3$. The suspension spray roasting such applied yields a catalyst which cannot be produced so homogeneously dispersed by any other of the above described impregnation techniques or similar methods.

The invention described relates to catalysts within their oxide forms, such as pure or mixed oxides of Ni, Co, Mo, V, W, Ti, Cr, Al, P, pure or deposited on inert carriers, such as silicates, $Al_2O_3$, which are pyrolyzed together with the other salts.

Oxidation processes usually use catalysts made of vanadium, molybdenum, tungsten or titanium. For example, o-xylene or naphtene are oxidized to phthalic anhydride using a mixture of $V_2O_5/TiO_2$. Ammoxidation processes, e.g. oxidation of 3- or 4-methylpyridine + $NH_3$ to form 3- or 4-cyanopyridine, use catalysts based on $V_2O_5/MoO_3/Al_2O_3$ mixtures. In general, metals like nickel, cobalt or molybdenum are catalytically active within hydrogenation reactions. Examples are the hydrogenation of aromatic rings such as benzene to cyclohexane, using nickel as a catalyst, also the oxidation of nitriles to amines, using Raney nickel. Dehydrogenation or dehydration reactions normally use chromium, iron or aluminum catalysts, to mention e.g. the conversion of butane towards butadiene which is catalyzed selectively by $Cr_2O_3/Al_2O_3$.

In some cases are the catalysts which were made by the pyrohydrolysis method described here already proper for their use without any further treatment. However, the special catalysis process or application of the catalyst(s) may require also further treatment of the spray-roasted powder. Those processes would be: milling, blending with ceramic cements, extrusion coextrusion, dry pressing and slip casting to make pellets, reduction of the metallic component(s) and eventually a thermal treatment to gain a certain crystallographic form.

The inventive process described here will be further explained by the production scheme included and as well as by two examples of catalyst preparation:

DESCRIPTION OF SPECIFIC EMBODIMENTS OF THE INVENTION

In general the pyrohydrolysis processes can be defined with:

$$MeCl_2 + xH_2O \longrightarrow MeO + 2HCl + (x-1)H_2O$$

$$2MeCl_3 + xH_2O \longrightarrow Me_2O_3 + 6HCl + (x-3)H_2O$$

$$2MeCl_2 + xH_2O + \tfrac{1}{2}O_2 \longrightarrow Me_2O_3 + 4HCl + (x-2)H_2O$$

$$2MeCl_3 + xH_2O + \tfrac{1}{2}O_2 \longrightarrow 2MeO_2 + 6HCl + (x-3)H_2O$$

$$Me(NO_3) + H_2O \longrightarrow MeO + 2HNO_3$$

$$Me(NO_3)_3 + 3/2\, H_2O \longrightarrow \tfrac{1}{2}Me_2O_3 + 3HNO_3$$

These formulas also equally relate to fluorine salts.

The oxides such produced possess a 1-100% variation possibility of their constituents, comprising two or more metals. This is of advantage within catalytic systems, which are applied during synthesis of higher alcohols starting from CO+H₂, i.e. an oxo synthesis. Those catalyst systems have compositions of many constituents, like CuCoMo₀.₈K₀.₁-oxide (M=Cr, Mn, Fe, V).

In the following an example will be given of the production of a nickel catalyst with Al₂O₃ as carrier material starting from the chloride system in solution. This example equally relates to all other hydrogenation catalytic systems such as Co, Mo, V, Ti. It also holds for all other salt solution systems to start with, such as nitrates or fluorides. All these systems do have the same process way.

Figure 1:
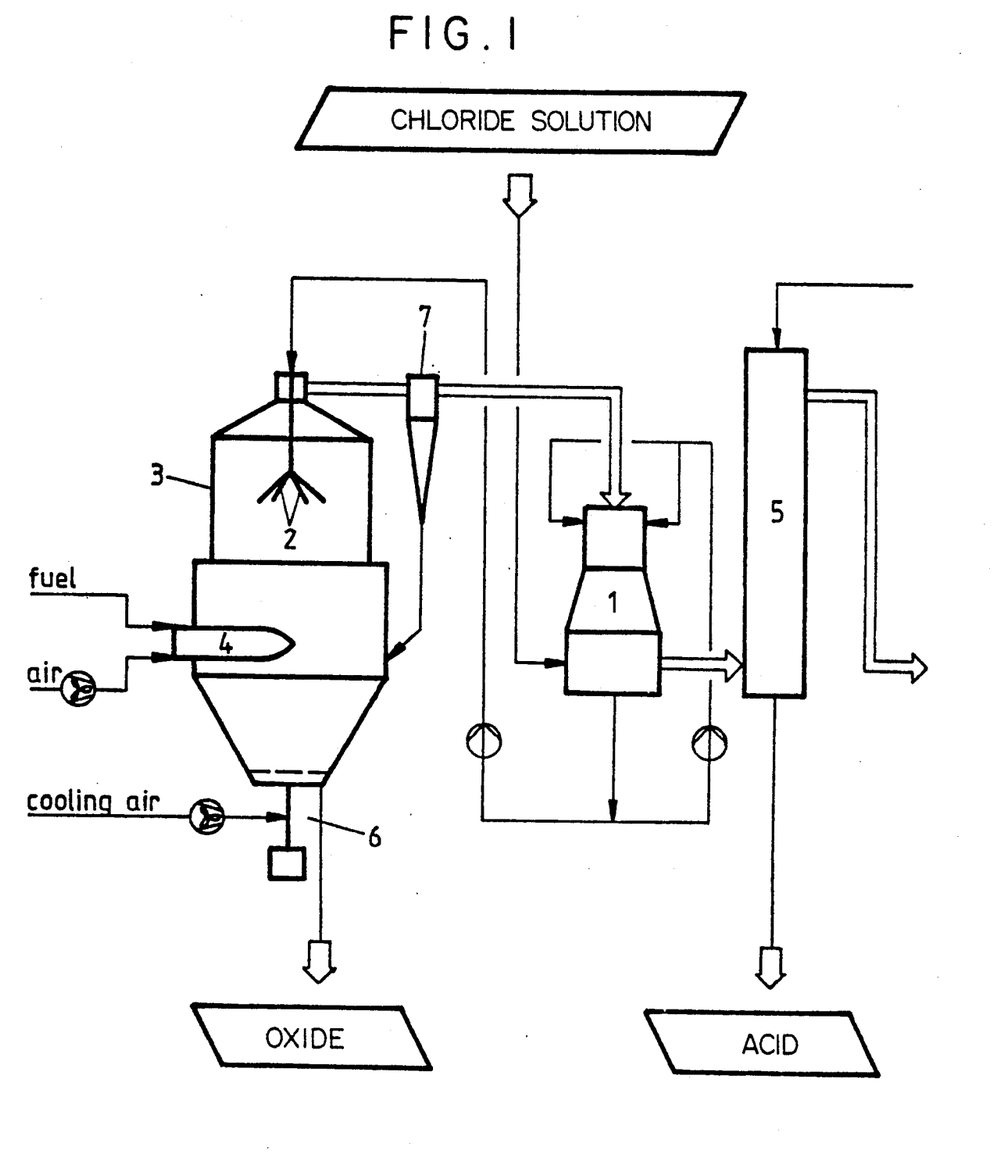
FIG. 1 gives a schematic drawing of the pyrohydrolysis plant.

The starting solution of this example given now contains the nickel and aluminum salts in form of their respective chlorides. In FIG. 1, this solution passes first a preconcentrator unit 1 and is then sprayed by means of spray nozzles 2 into the reactor 3. Spraying of the solution allows a final oxide powder of high surface area and small primary particle sizes.

The sprayed solution is heated by the circumferential gas burners 4 which allows the conversion of the dissolved salts into the respective metal oxides and the free acids of the corresponding anions. The acid(s) can be regained by means of an absorption tower 5 and can be recycled towards any dissolving process, if required. The metal oxides such produced are transferred from the conical bottom of the reactor 3 by means of a screw conveyor 6, which may preferably be heated. A cyclone 7 is provided to recycle particle fines from the gas stream back to the reactor.

Figure 2A:
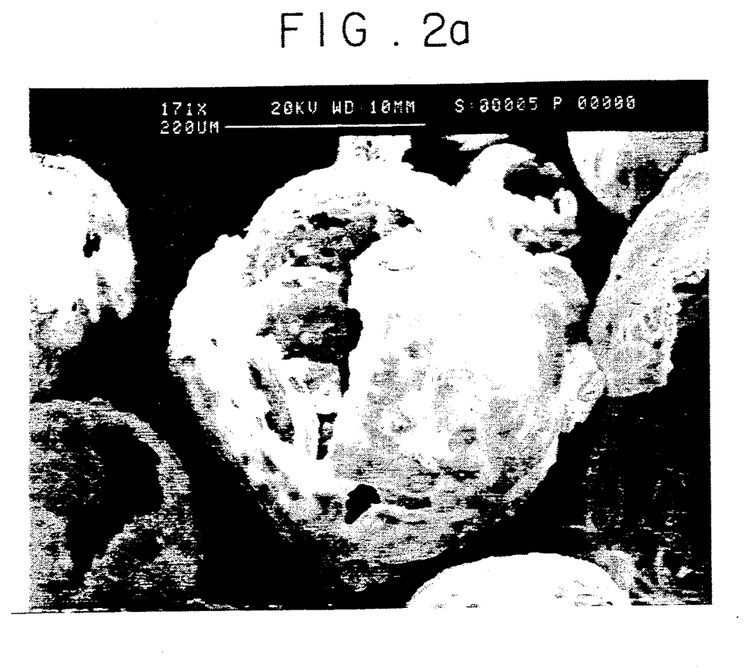
FIG. 2a shows a SEM picture of spray roasted NiO/NiAl₂O₄ agglomerates.

The powder agglomerates formed by this spray roasting process have a typical hollow spherical form, as can be seen from FIG. 2a where NiO/NiAl₂O₄ agglomerates are shown. The nickel cations are very homogeneously distributed within the carrier matrix. The mean particle size of these agglomerates amounts to 25 microns, mostly between 20 and 30 microns, with big agglomerate particles of 1 to 500 microns, mostly between 50 to 500 microns. The primary crystal sizes of these agglomerates amount to 0.5 to 1 microns.

Oxide powders, mixtures of oxides or mixed oxide crystals made by this pyrohydrolysis process possess a rather big specific surface area of about 15 to 50 m²/g. This surface area can be varied within the spray pyrolysis process and depends on the type of anion being dissolved, the pressure within the spray nozzles and the contact time of the droplets within the hot zone of the reactor. Only in very rare cases, the lower limit of about 1 m²/g is reached.

Maximum surface areas which could be gained with spray roasted nickel catalysts amounted to 100 m²/g. Such big surface areas have certain ceramic advantages, such as easiness of blending with ceramic cements and a high sinter reactivity in formation of ceramic parts, such as pellets, balls, Raschig- or Pall-rings, etc.

Chlorine or fluorine compounds, of which these catalysts described here start with, are catalyst poisons. Therefore, the reaction temperature has to be high enough to avoid their presence within the final oxide powder. Reaction temperatures within the reaction zone of the spray roaster has to exceed 700° C. On the other hand, however, formation of nickel spinels together with the alumina has to be avoided, because of their catalytic inertness. If formed, however they can be destroyed by suitable prereduction with hydrogen gas, at temperatures of about 500° C. or even higher, where the spinel structure is opened and the nickel transforms to the metallic state. During such severe prereduction conditions the particle fine structure, i.e. surface area, does not reveal any changes, if prereduction temperature does not exceed 800° C.

It is a further claim of the present invention to have the spray roasted nickel-alumina-powder prereduced in hydrogen at 1 bar pressure during 4 hours at a minimum of 500° C. towards a maximum of 800° C., to get a high reactive nickel hydrogenation catalyst.

EXAMPLES

Example 1

A solution comprising 167 g/l NiCl₂ and 209,6 g/l AlCl₃ has been spray roasted within a roasting reactor described, of a throughput capacity of 300 l/h solution, and a hot zone temperature between 850° to 950° C.

End product was a mixed oxide of NiO and Al₂O₃ which had 60% NiO or 47% Ni, the rest Al₂O₃. Specific surface amounted to 29,6 m²/g, the mean particle size was 22,5 microns, the agglomerate structures had a mean size of 75 microns.

After the prereduction in $H_2$ at 1 bar pressure and a temperature of 480° C. during 72 hours, the catalyst activity was measured on the reaction of $CO + 3H_2 \rightarrow CH_4 + H_2O$. Reaction products, namely $CH_4$ (methane), as well as $CO_2$ of a possible side reaction or even higher paraffines were traced analytically by means of a gas chromatograph.

Figure 3A:
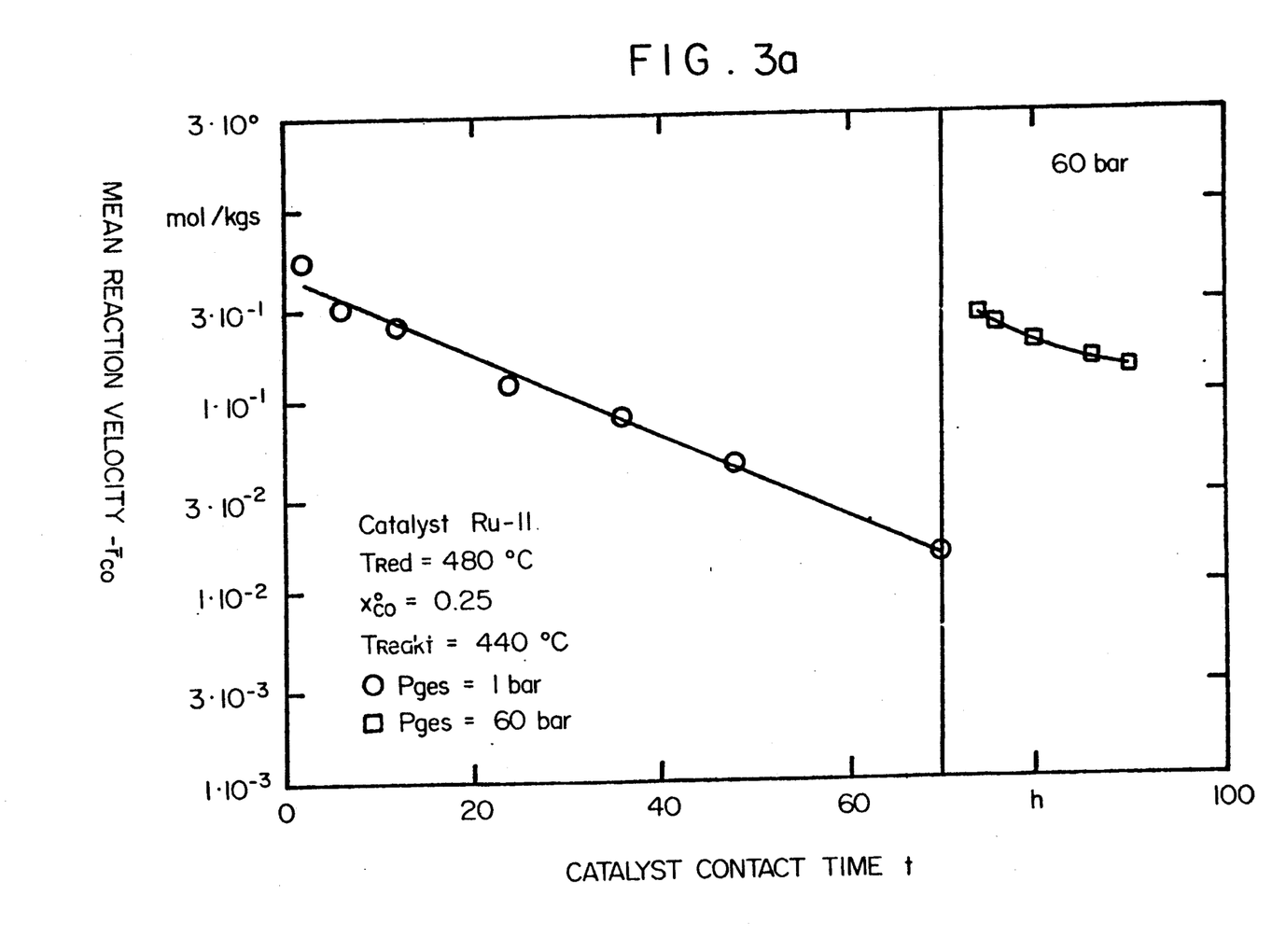
FIG. 3 shows reaction kinetics of catalytic deactivation applying a spray roasted hydrogenation catalyst for the methanation test reaction: CO+3H₂→CH₄+H₂O. The catalyst was previously prereduced at 480° C. (H₂, 1 bar) during 72 hours and the methanation reaction was run at 1 bar total pressure (FIG. 3a) or 60 bar total pressure (FIG. 3b) within reaction system.
Figure 3B:
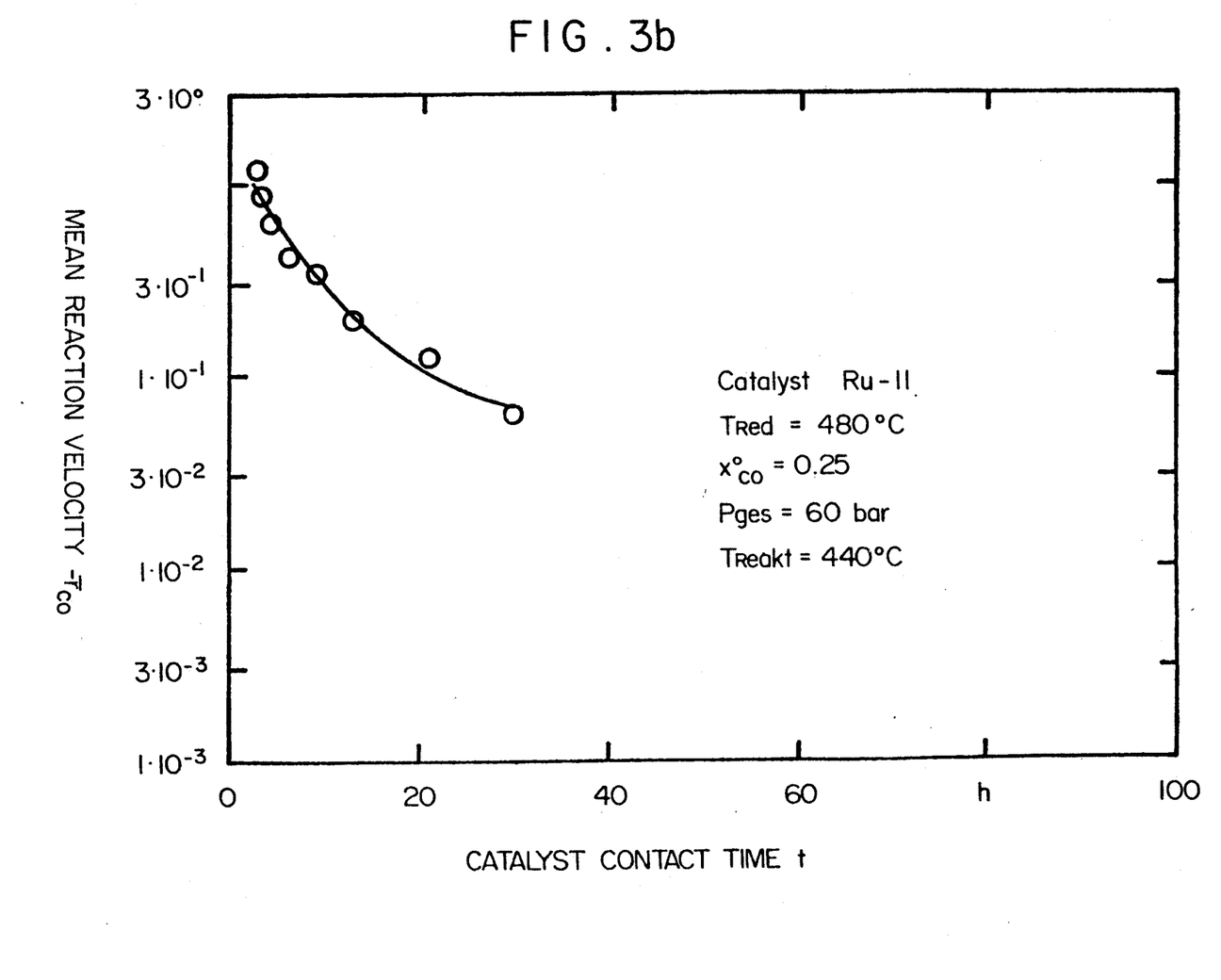
Figure 4:
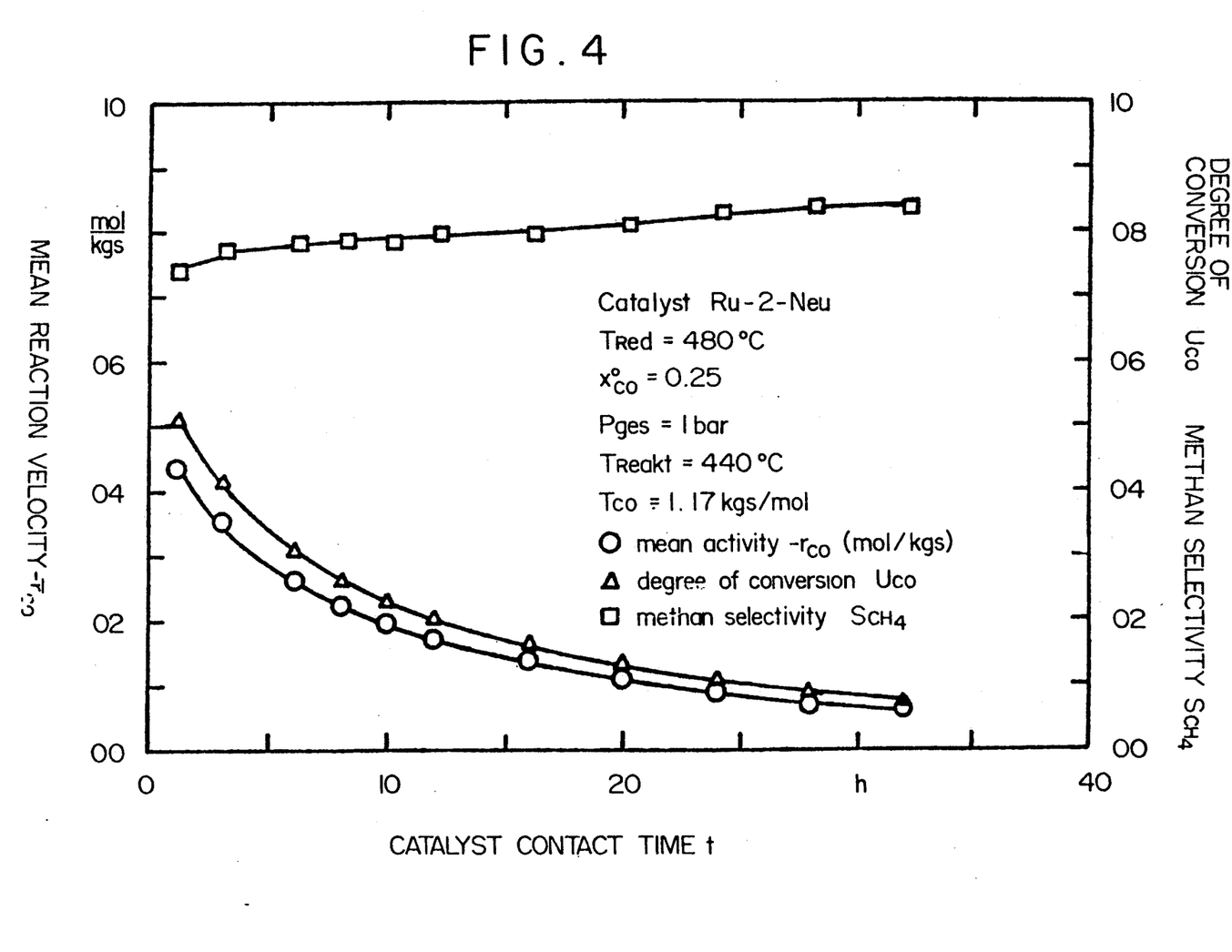
FIG. 4 gives a test reaction like in FIG. 3, but after a 800° C. catalyst prereduction (H₂, 1 bar) during 4 hours showing degrees of conversion and selectivity of methane formation.
Figure 5:
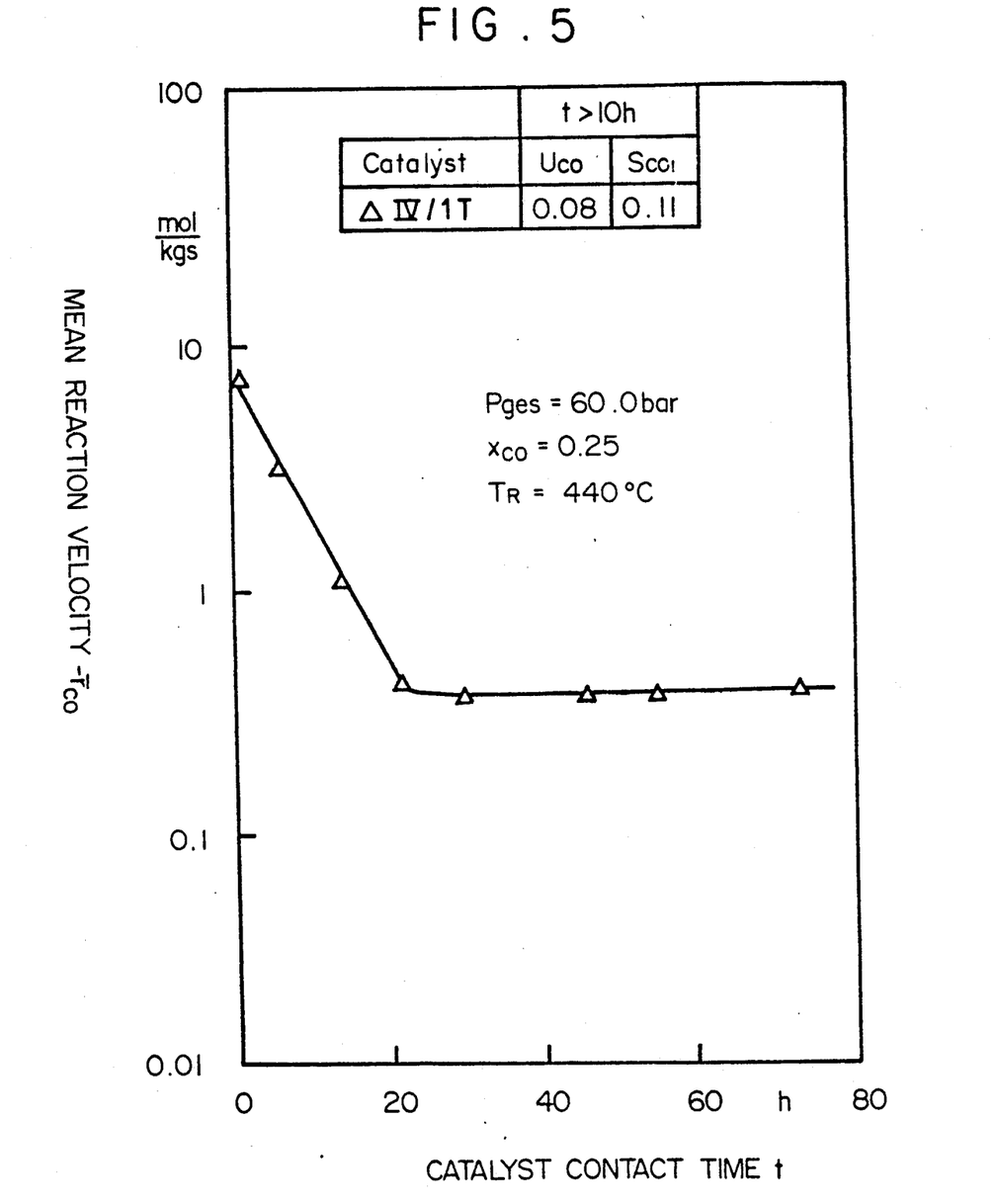
FIG. 5 gives a comparison of a catalyst made by impregnation techniques and containing about the same nickel concentration as a catalyst according to the invention.

The respective results of this reaction, the mean reaction speed with these catalysts can be seen in FIG. 3. In FIG. 4 the reactivity (reaction speed) is compared after prereduction of this catalyst at the highest possible temperature of 800° C., at 1 bar $H_2$ and during 4 hours.

As a common result of these investigations it can be summed up that nickel catalysts which were prepared by spray pyrolysis and which possess more than 33% of nickel, showed good hydrogenation activities.

Figure 6:
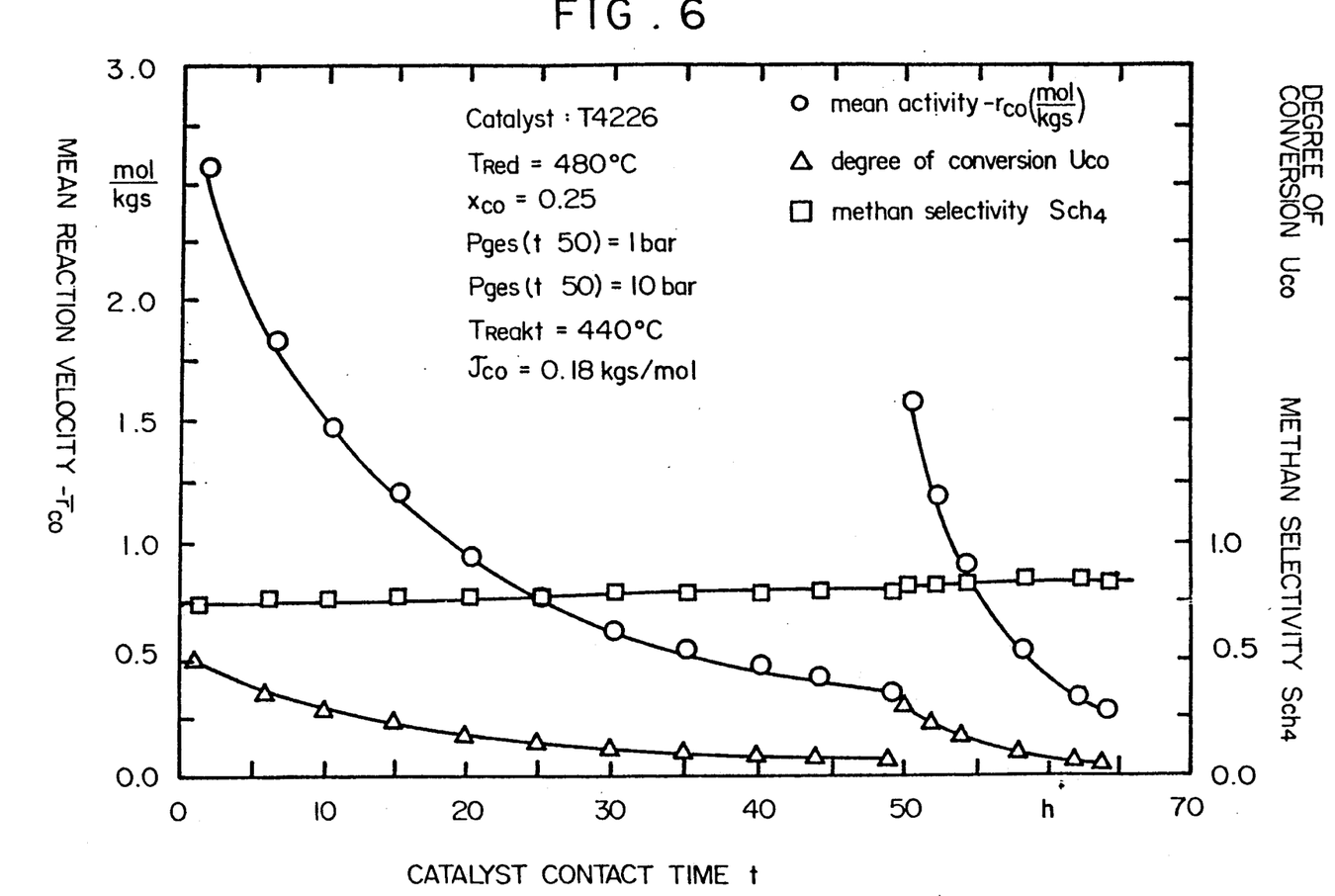
FIG. 6 gives the specific reactivity of the industrially used catalyst T 4226, with the same reaction parameters as stated in FIGS. 3 to 4. This catalyst to which the catalyst produced according to the invention is being compared has been manufactured by a coextrusion process and is generally regarded as top methanation catalyst.

The catalytic activity of a 60% NiO (47% Ni) containing catalyst was compared with an industrially reknown hydrogenation catalyst, made by impregnation techniques (see FIG. 6). It was also compared with the industrially reknown catalyst system, T 4226, made by co-extrusion of NiO and $Al_2O_3$ (see FIG. 6, which shows catalyst deactivation during methanation reaction). In both cases the catalytic activity of the spray roasted and prereduced catalyst was comparable or even better than the other industrially proven catalysts.

Example 2:

The example refers to the making of an oxidation catalyst by means of a spray roasting process. The basis chosen was $TiO_2$ (titaniumdioxide) as a suitable carrier and $V_2O_5$ (vanadiumpentoxide) as the respective catalytically active component. Such a catalyst system is being widely applied in form of coextruded honeycombs for the cleaning of industrial stack gases (SCR or DENOX catalysts). It is also being applied within chemical process industries as oxidation catalyst, in production of anhydrides of organic acids, starting from paraffines or aromatic ring systems, with $V_2O_5$ or $MoO_3$ as the catalytic constituent, using carriers such as $TiO_2$, $Al_2O_3$ or $P_2O_5$. Also the latter catalyst systems can be made by a spray roasting process, starting with solutions of the corresponding salts, of proper mixtures of $VCl_2$, ($VCl_3$, $VOCl_2$), $MoCl_5$ or ($NH_4$)$VO_3$, or ($NH_4$)$_2MoO_4$, together with $TiOCl_2$, $AlCl_3$, $H_3PO_4$ or also starting of the corresponding mixtures of nitric or fluoric salts, or mixtures hereof (HF-$HNO_3$).

Figure 2B:
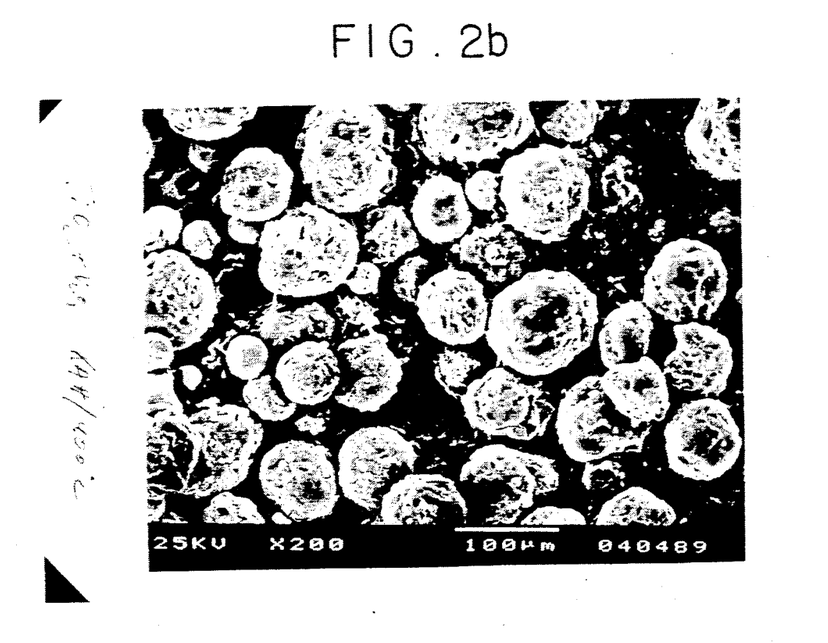
FIG. 2b shows a SEM picture of TiO₂/V₂O₅ agglomerates made by the pyrohydrolysis process.

As an example given, catalyst preparation will start with a chloridic solution, containing 372,5 g/l $TiOCl_2$ and 61,3 g/l $NH_4VO_3$, as well as 90-100 g free HCl/l. This solution can be pyrolized at temperatures of 500° to 600° C. with successive formation of the mixed oxides, comprising $TiO_2$ and $V_2O_5$. The acid is converted in full by the process. The oxide powder being formed comprises agglomerate structures which have a size of 50 to 100 microns (FIG. 2b) and has a composition of 80% $TiO_2$ and 20% $V_2O_5$. The specific surface area which depends on reaction temperature, spray nozzles, the angle of spraying and reactor contact time, amounts to 40 to 60 $m^2/g$. This oxide powder mixture can be further processed to form ceramic parts like rings, balls, pellets, honeycombs. It gives a suitable catalyst for oxidation processes such as: DENOX, oxidation of paraffines, oxidation of aromatic rings. Vanadiumpentoxide ($V_2O_5$) further is also a catalyst for sulfuric acid production, i.e. oxidation of $SO_2$ towards $SO_3$. A mixture of $V_2O_5/TiO_2$ is further known to catalyze a reaction such as o-xylene$\rightarrow$phthalic anhydride.

Chromium oxide which is dehydration catalyst, can also be made by the spray roasting process, starting with a chlorine solution, and being roasted alone or together with aluminum chloride or with ferrous chloride.

All the other carrier systems, e.g. on silica basis, such as $SiO_2.Al_2O_3$, $SiO_2$, bentonite or aerosil, have also high importance within catalysis. They equally can be applied through the suspension spray roasting process, mentioned above. Suspension again means an acidic or neutral solution of the salts comprising the catalytically active constituents together with the insoluble particles (spuspended therein) of the respective carrier. The spray pyrolysis allows a homogeneous and fine dispersed precipitation of the oxide on the carrier surface in a continuous process, during the formation of the oxides within the reactor.

In general the application of chloridic solutions during these processes is recommended, because of their general availability and relative cheapness of chloride salts.

We claim:

1. Process for producing catalysts for use in heterogeneously catalyzed reactions, consisting of pure oxides, mixtures of oxides or mixed oxide crystals of nickel, cobalt, molybdenum, vanadium, chromium, aluminum, iron, titanium, and tungsten, starting with the aqueous solutions of the respective salts, comprising the steps of:

spraying said solution into a hydropyrolysis reactor, whereby a thermal dissociation of the primary molecules occurs to form their respective oxides in powdered form, with specific surface areas of 1 to 100 $m^2/g$ and agglomerate structures of 1 to 500 microns, having a mean particle size of 20 to 30 microns, converting the corresponding acids by hydrolyzing the anions of the primary solutions; and recovering in full said corresponding acids.

2. Process for producing catalysts for their use in heterogeneously catalyzed reactions consisting of pure oxides, mixtures of oxides or mixed oxide crystals of nickel, cobalt, molybdenum, vanadium, chromium, titanium, aluminum, iron, and tungsten, starting with aqueous solutions of the respective salts, comprising the steps of:

spraying said solution into a hydropyrolysis reactor, whereby a thermal dissociation of the primary molecules and a transformation into the corresponding oxides, having specific surface areas ranging in between 1 to 100 $m^2/g$, mean agglomerate sizes of 1 to 500 microns, and a mean particle size of 20 to 30 microns, is affected, and the corresponding acids are converted by hydrolysis of the anions of the primary solution; and recovering in full said corresponding acids, wherein inert carriers are spray roasted together with these solutions, by a suspension spray roasting process, in which the salt solution is sprayed in form of a suspension together with these carriers.

3. Process of claim 1, characterized in that the oxides or the oxide mixtures or the oxide mixed crystals formed are prereduced in streaming hydrogen at 1 bar pressure at a reduction temperature between 500° to 800° C., at a mean contact time of 4 hours.

4. Catalysts made by this process, according to claim 1, characterized in that for oxidation processes the catalytically active elements are vanadium, molybdenum, tungsten or titanium.

5. Catalysts made by the process of claim 1, characterized in that for hydrogenation processes the catalytically active elements are nickel, cobalt or molybdenum.

6. Catalysts made by this process, of claim 1, characterized in that for dehydration or dehydrogenation processes the catalytically active elements are chromium, aluminum or iron.

7. Catalysts, made by process of claim 4, wherein the catalytically active oxide can be further processed through known ceramic methods together with cement binders to make ceramic forms.

* * * * *